US011617316B2

(12) United States Patent
Ray, Jr.

(10) Patent No.: US 11,617,316 B2
(45) Date of Patent: Apr. 4, 2023

(54) APPARATUS AND METHODS FOR A HYDROPONICS SYSTEM WITH ENHANCED HEAT TRANSFER

(71) Applicant: James S. Ray, Jr., Cary, NC (US)

(72) Inventor: James S. Ray, Jr., Cary, NC (US)

(73) Assignee: James S. Ray, Cary, NC (US)

( * ) Notice: Subject to any disclaimer, the term of this patent is extended or adjusted under 35 U.S.C. 154(b) by 429 days.

(21) Appl. No.: 16/186,447

(22) Filed: Nov. 9, 2018

(65) Prior Publication Data

US 2019/0141923 A1 May 16, 2019

Related U.S. Application Data

(60) Provisional application No. 62/584,568, filed on Nov. 10, 2017.

(51) Int. Cl.
*A01G 31/06* (2006.01)
*F21V 29/503* (2015.01)
(Continued)

(52) U.S. Cl.
CPC ............. *A01G 31/06* (2013.01); *A01G 7/045* (2013.01); *A01G 9/246* (2013.01); *A01G 9/247* (2013.01);
(Continued)

(58) Field of Classification Search
CPC .. A01G 31/06; A01G 2031/006; A01G 31/02; A01G 31/04; A01G 7/045;
(Continued)

(56) References Cited

U.S. PATENT DOCUMENTS 2,896,374 A * 7/1959 Perin ...................... H01H 51/28
47/62 R
2,940,218 A * 6/1960 Carter .................... A01G 31/06
47/62 R
(Continued)

FOREIGN PATENT DOCUMENTS

JP 2007159410 A 6/2007
JP 2016036312 A 3/2016
(Continued)

OTHER PUBLICATIONS

International Search Report and Written Opinion dated Feb. 7, 2019, regarding PCT/US2018/60224.

*Primary Examiner* — Ebony E Evans
(74) *Attorney, Agent, or Firm* — Procopio, Cory, Hargreaves & Savitch LLP (57) ABSTRACT

Apparatus and methods for a hydroponics system with enhanced heat transfer are presented herein. By arranging the flow hydroponics system to have a series flow pattern via tubes and hydroponic pans, heat may be transferred from heat producing elements. The heat producing elements, including light emitting diodes (LEDs), may be thermally attached to the pans. The recycled heat can be transferred to the series circulating water supply for providing nutrient rich minerals at the roots of plants. Additionally, the heat can be transferred via the pans and without the need for costly fans or specialized heat sinks. In this way more space can be availed for the production of plants while recycling energy in the form of transferred heat.

34 Claims, 10 Drawing Sheets

(51) Int. Cl.

| | |
|---|---|
| *F21V 23/02* | (2006.01) |
| *F21V 29/58* | (2015.01) |
| *F21V 23/00* | (2015.01) |
| *A01G 7/04* | (2006.01) |
| *F21V 29/70* | (2015.01) |
| *A01G 9/26* | (2006.01) |
| *A01G 9/24* | (2006.01) |
| *A01G 31/00* | (2018.01) |
| *F21Y 115/10* | (2016.01) |

(52) U.S. Cl.
CPC .............. *A01G 9/26* (2013.01); *F21V 23/003* (2013.01); *F21V 23/02* (2013.01); *F21V 29/503* (2015.01); *F21V 29/59* (2015.01); *F21V 29/70* (2015.01); *A01G 2031/006* (2013.01); *F21Y 2115/10* (2016.08)

(58) Field of Classification Search
CPC .......... A01G 9/246; A01G 9/247; A01G 9/26; F21V 29/59; F21V 29/70; F21V 23/003; F21V 23/02; F21Y 2115/10
USPC ......................................................... 47/62 R
See application file for complete search history.

(56) References Cited

U.S. PATENT DOCUMENTS

| | | | | |
|---|---|---|---|---|
| 2,952,096 | A * | 9/1960 | Hughes | A01G 31/06 47/60 |
| 3,314,192 | A * | 4/1967 | Park | A01G 9/022 47/18 |
| 3,606,697 | A * | 9/1971 | Eden | A01G 9/16 47/69 |
| 4,051,626 | A * | 10/1977 | Trumley | A01G 9/16 47/17 |
| 4,170,844 | A * | 10/1979 | Steele | A01G 31/06 47/62 R |
| 4,276,720 | A * | 7/1981 | Lyon | A01G 27/04 47/14 |
| 4,514,929 | A * | 5/1985 | Lestraden | A01G 31/06 47/17 |
| 5,009,029 | A * | 4/1991 | Wittlin | A01G 31/02 47/62 C |
| 5,042,196 | A * | 8/1991 | Lukawski | A01G 31/02 47/65 |
| 5,323,567 | A * | 6/1994 | Nakayama | A01G 31/042 47/65 |
| 6,061,957 | A * | 5/2000 | Takashima | A01G 22/15 47/60 |
| 6,105,309 | A * | 8/2000 | Takayanagi | A01G 31/02 47/62 R |
| 6,359,392 | B1 * | 3/2002 | He | H05B 45/10 315/291 |
| 9,107,256 | B2 * | 8/2015 | Kang | H05B 45/37 |
| 9,547,319 | B2 * | 1/2017 | Zulim | H05B 47/18 |
| 9,642,209 | B2 * | 5/2017 | Eisele | H05B 47/105 |
| 9,775,330 | B1 * | 10/2017 | Chen | A01K 63/00 |
| 9,901,045 | B2 * | 2/2018 | Miyabe | A01G 9/20 |
| 10,624,275 | B1 * | 4/2020 | Lewis | A01G 9/249 |
| 10,638,678 | B2 * | 5/2020 | Collier | A01G 9/20 |
| 2010/0020536 | A1 * | 1/2010 | Bafetti | F21V 29/502 362/231 |
| 2012/0279127 | A1 * | 11/2012 | Yusibov | A01G 31/06 47/62 N |
| 2013/0102076 | A1 * | 4/2013 | Licamele | C12M 41/06 435/420 |
| 2014/0017043 | A1 * | 1/2014 | Hirai | A01G 31/06 414/267 |
| 2014/0115958 | A1 | 5/2014 | Nishimoto | |
| 2014/0259920 | A1 * | 9/2014 | Wilson | A01C 1/00 47/62 R |
| 2014/0366443 | A1 * | 12/2014 | Brusatore | A01G 22/00 47/66.7 |
| 2015/0305108 | A1 * | 10/2015 | Probasco | H05B 45/20 47/58.1 LS |
| 2015/0342133 | A1 * | 12/2015 | Nakajima | A01G 31/02 47/62 R |
| 2016/0295820 | A1 * | 10/2016 | Aykroyd | A01G 7/02 |
| 2016/0360712 | A1 * | 12/2016 | Yorio | A01G 31/06 |
| 2017/0079223 | A1 | 3/2017 | Nelson | |
| 2017/0181393 | A1 | 6/2017 | Nelson | |
| 2017/0264236 | A1 * | 9/2017 | Liu | H02S 20/23 |
| 2018/0054986 | A1 * | 3/2018 | Fu | A01G 7/04 |
| 2018/0352755 | A1 * | 12/2018 | Szoradi | A01G 9/20 |
| 2019/0021249 | A1 * | 1/2019 | Ivanescu | A01G 9/047 |
| 2019/0082613 | A1 * | 3/2019 | Eisele | H05B 47/105 |
| 2019/0110407 | A1 * | 4/2019 | Su | A01G 27/00 |
| 2019/0259108 | A1 * | 8/2019 | Bongartz | A01G 9/0297 |
| 2020/0184153 | A1 * | 6/2020 | Bongartz | G06N 5/04 |
| 2020/0253133 | A1 * | 8/2020 | Lewis | A01G 31/06 |

FOREIGN PATENT DOCUMENTS

| | | | |
|---|---|---|---|
| KR | 101279050 B1 | 7/2013 | |
| WO | WO-0203777 A1 * | 1/2002 | .......... A01G 31/042 |
| WO | WO-2013082601 A1 * | 6/2013 | ............ A01G 31/02 |
| WO | 2016175021 A1 | 11/2016 | |

* cited by examiner

APPARATUS AND METHODS FOR A HYDROPONICS SYSTEM WITH ENHANCED HEAT TRANSFER

CROSS-REFERENCE TO RELATED APPLICATION

This application claims the benefit under 35 U.S.C. § 119(e) of U.S. Provisional Application No. 62/584,568, filed Nov. 10, 2017, entitled "APPARATUS AND METHODS FOR A HYDROPONICS SYSTEM WITH INTEGRATED GROW LIGHTS," the entirety of which is hereby incorporated by reference.

INTRODUCTION

The present disclosure relates generally to hydroponics systems, and more specifically to hydroponics systems using light emitting diodes (LEDs) and pumps.

Hydroponics pertains to growing plants in a water based, nutrient rich solution without soil. Hydroponic techniques may be used for growing both foods and medicinal plants. In some hydroponic systems plants are grown with their roots exposed to mineral solutions. In other systems the roots may be supported by gravel or a similar inert medium. Nutrients may be derived from organic byproducts, e.g., manure, dead fish, etc.

Grow lights and/or horticulture lighting systems may be used for providing light to growing plants. Lighting technologies for grow lights may be based on any of fluorescent lighting, light emitting diodes (LEDs), metal halide lighting, high pressure sodium lighting, etc. One measure of light for assessing a horticulture light system is photosynthetic active radiation (PAR). PAR light corresponds to wavelengths within the visible range of 400 to 700 nanometers (nm), e.g., that may be useful for photosynthesis.

SUMMARY

Several aspects of hydroponic systems will be described more fully hereinafter with reference to hydroponic pans arranged for a series flow pattern.

In one aspect a hydroponics system comprises a plurality of hydroponics pans, a pump, and a light source. The plurality of hydroponics pans comprises a first hydroponics pan and a second hydroponics pan. The first hydroponics pan is configured to receive a grow solution via a first tube and to transport the grow solution to a second tube. The second hydroponics pan is configured to receive the grow solution via the second tube and to transport the grow solution to a third tube. The pump is configured to pump the grow solution to the first hydroponics pan via the first tube. The light source is thermally attached to at least one of the plurality of hydroponics pans; the at least one of the plurality of hydroponics pans is configured to conduct heat from the light source to the grow solution.

In another aspect a method of operating a hydroponics system comprises: pumping a grow solution; circulating the grow solution in a first hydroponics pan; conducting heat from a first light emitting diode (LED); draining the grow solution via a first tube; circulating the grow solution in a second hydroponics pan; and draining the grow solution to the pump via a second tube. The grow solution is pumped to the first hydroponics pan from a pump. The grow solution is circulated in the first hydroponics pan to the first tube. The grow solution is drained via the first tube. The grow solution is circulated in the second hydroponics pan to the second tube.

In another aspect a hydroponics system comprises a plurality of hydroponics pans, a pump, and a light source. The plurality of hydroponics pans are arranged in an array and comprise a top pan and a bottom pan. The pump is connected to an outflow tube. The outflow tube is configured to provide a water supply to the top pan; and the pump is configured to receive the water supply from the bottom pan. The light source is in thermal contact with at least one of the plurality of hydroponics pans. The at least one of the plurality of hydroponics pans is configured to transfer heat from the light source to the water supply. The at least one of the plurality of hydroponics pans is configured to receive the water supply from a first tube, to circulate the water supply, and to drain the water supply via a second tube separated from the first tube.

It will be understood that other aspects of hydroponic systems will become readily apparent to those skilled in the art from the following detailed description, wherein it is shown and described only several embodiments by way of illustration. As will be appreciated by those skilled in the art, the hydroponic systems can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for a hydroponics system with enhanced heat transfer will now be presented in the detailed description by way of example, and not by way of limitation, in the accompanying drawings, wherein.

DETAILED DESCRIPTION

The detailed description set forth below in connection with the drawings is intended to provide a description of example aspects of hydroponics systems with integrated grow lights, and it is not intended to represent the only embodiments in which the invention may be practiced. The term "example" used throughout this disclosure means "serving as an example, instance, or illustration," and should not necessarily be construed as preferred or advantageous over other aspects presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Hydroponics and hydroponic systems can be used indoors with a horticulture lighting system to grow a variety of plants, e.g., including vegetables, tomatoes, fruit, flowers, etc. This variety may be referred to herein as cultivars. Horticulture lighting systems can include grow lamps, ballasts, and lamp drivers. For instance, grow lamps can be provided in the form of light emitting diodes (LEDs) which can be controlled using LED drivers. LED drivers can control LED current by using pulse width modulation (PWM) and/or by controlling resistance via a potentiometer.

In a hydroponics system and in an indoors hydroponics system, it can be important to control the temperature of the hydroponics environment. As grow lamps, LEDs, and components of a horticulture lighting system emit heat, they require additional external, and sometimes costly, heat sinks and fans. The heat may need to be vented away from the hydroponics environment to prevent the environment temperature, e.g., the room temperature of the surrounding room, from increasing uncontrollably. This may require additional Heating, Ventilation, and Air Conditioning (HVAC) to be installed to control the room temperature. Such requirements for HVAC systems may reduce the amounts of surface area available to grow cultivars. However, this process of using additional components to remove heat from the lighting system (i.e., horticulture lighting system) requires additional space and components. Such added space requirements and/or components may be space consuming, costly and/or add an undesirable amount of complexity to the manufacturing process. Accordingly, there is a need for a hydroponics system which reduces or eliminates the need for additional heat removal components. Aspects presented herein not only reduce the need for additional heat removal components but also enable the emitted heat from the lighting system to be recycled. Thus, aspects provide more efficient energy use.

Apparatus and methods for a hydroponics system with enhanced heat transfer are presented herein. By arranging the flow hydroponics system to have a series flow pattern, e.g., via drains and/or tubes, along a set of hydroponic pans, heat may be transferred from heat producing elements. The heat producing elements, including light emitting diodes (LEDs), may be thermally attached to the hydroponic pans. The hydroponics pans may comprise a material that is conductive to heat, e.g., as opposed to a plastic. For example, the hydroponics pan may comprise a metal that has a good heat conducting property. As one example, the pan may comprise steel. As another example, the pan may comprise aluminum. In one example, a thermal adhesive, e.g., 113, may be placed between the light source 111 and the pan 102 and/or between the driver 108 and the pan 102. The thermal adhesive may provide at least part of the coupling of the light source to the pan and may further improve the transfer of heat from the light source to the body of the hydroponics pan. The thermal adhesive may comprise a thermal paste, a thermal epoxy, a thermal grease, a thermal pad, aluminum tape, etc. The thermal adhesive may be used, e.g., with a light source comprising an LED array. Other fasteners may also be used to secure the light source and/or wiring to the hydroponics pan. For example, aluminum tape may be used to help secure the light source and/or wires to the hydroponics pan. In other examples, such as with a ceramic light source, a metal halide light sources, or a sodium light source, the thermal contact may be achieved without a thermal adhesive. The thermal contact may be achieved simply by physical contact between the light source and the body of the pan. Thus, the heat from the lights of the hydroponics system may be transferred to the pans themselves. The heat can be recycled by being transferred using a series circulating water supply for providing nutrient rich minerals at the roots of plants. The water may absorb heat from the pans and help to transfer and/or dissipate the heat throughout the hydroponics system and the water circulates through the hydroponics system. Thus, the heat can be transferred via the pans and/or water circulation without the need for costly fans or specialized heat sinks. By removing the need for additional heat dissipation components, more space can be availed for the production of plants while also recycling energy in the form of transferred heat.

Figure 1A:
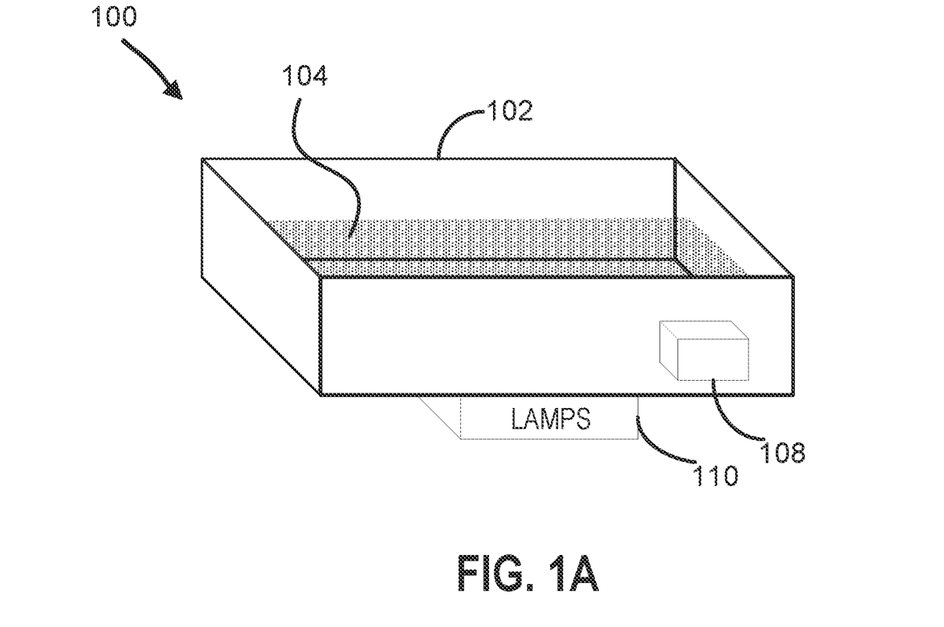
FIG. 1A illustrates a side perspective view of a light source in thermal contact with a hydroponics pan.

FIG. 1A illustrates a side perspective view 100 of a light source 110 in thermal contact with a hydroponics pan 102. Also as illustrated, an element 108 may also be in thermal contact with hydroponics pan 102, e.g., on a side opposite a side configured to hold plants, fluid, etc. The light source 110 may be realized with lamps and/or light emitting diodes (LEDs) for providing photosynthetic active radiation (PAR) light conducive to horticulture. In some aspects element 108 may include a lamp driver to provide power to the light source 110. For instance, element 108 may include an LED driver. Thus, element 108 may be coupled to light source 110.

The hydroponics pan 102 can contain a solution 104 (i.e., grow solution), the solution 104 can be water and/or a nutrient rich solution for plant roots. Having the light source 110 and element 108 in thermal contact with the hydroponics pan 102 can advantageously allow for dissipated heat from the light source 110 and/or element 108 to be transferred to the solution 104 via the contact of the light source 110/element 108 with the pan 102 and the contact of the grow solution 104 with the pan. For example, heat from the light source 110 may be transferred at the surface of a heat conductive hydroponics pan 102 into the solution 104, by virtue of the surface contact between the light and the pan. In this way thermal energy from the light source 110 and/or element 108 can be transferred as useful energy to the solution 104 without the need for large, costly heat sinks and/or fans. When used for plants, the solution may continue to make thermal contact with the body of the pan, enabling the solution to absorb heat from the pan body, as the pan body absorbs heat due to the thermal contact with the lights.

Although FIG. 1A shows a single element 108 and a single light source 110 as being connected to the hydroponics pan 102, the example is merely illustrative of the principle. Multiple light sources 110 and/or multiple driver elements 108 may be coupled to a hydroponics pan. In some aspects, the solution 104 may comprise water for growing microgreens.

Figure 1B:
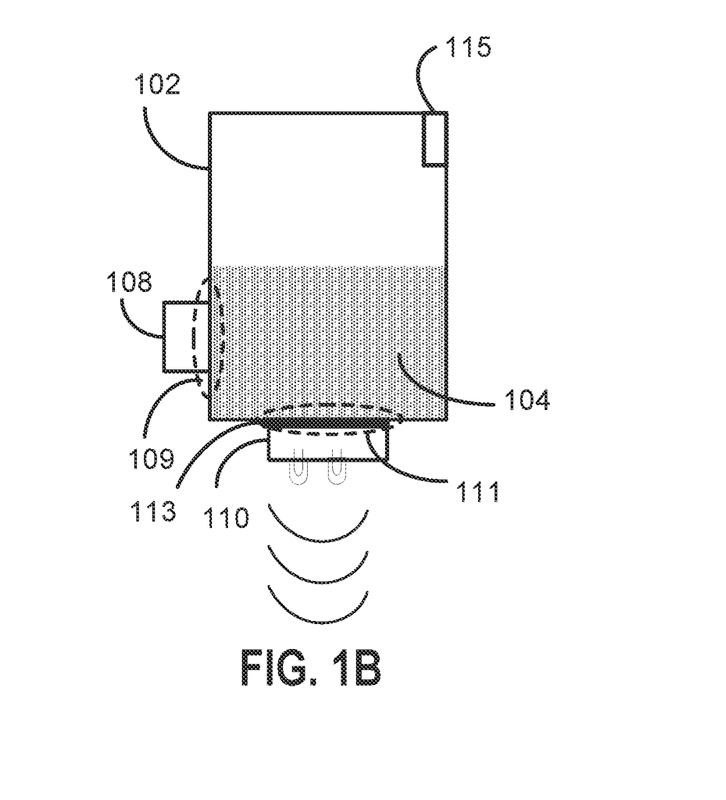
FIG. 1B illustrates a system block diagram of the light source in thermal contact with the hydroponics pan.

FIG. 1B illustrates a system block diagram of the light source 110 in thermal contact with a heat conductive hydroponics pan 102. The light source 110 is coupled to, connected to, or fastened to the pan 102 to form thermal contact between the pan and the light source. The light source 110 is positioned to form an interface 111 with the pan 102. Element 108 may similarly be coupled to, connected to, or fastened to the pan 102 to form an interface 109 with the pan 102. The interface 111 enables heat to be conducted from the light source 110 via the interface 111 into the solution 104; and heat can conduct from the element 108 via the interface 109 into the solution 104. The hydroponics pan 102 can be made of materials such as metal which have a high or substantially high thermal conductivity. A light source may require a light source case temperature to remain below a certain temperature in order to operate at a particular level, e.g., a temperature below 25° to operate at a higher, 2.1 A drive current. At higher temperatures, the light source may need to operate at a lower drive current. A high thermal conductivity can advantageously enhance the conduction of heat from the light source 110. The present application helps to maintain the case of the light source and corresponding semiconductor at the same temperature of the hydroponics pan that may be controlled by thermostat inside house. This enables the lights to operate at a higher drive current. Therefore, fewer light sources may be needed to achieve the same result in growing cultivars. This can reduce the cost of the hydroponics system.

Figure 2:
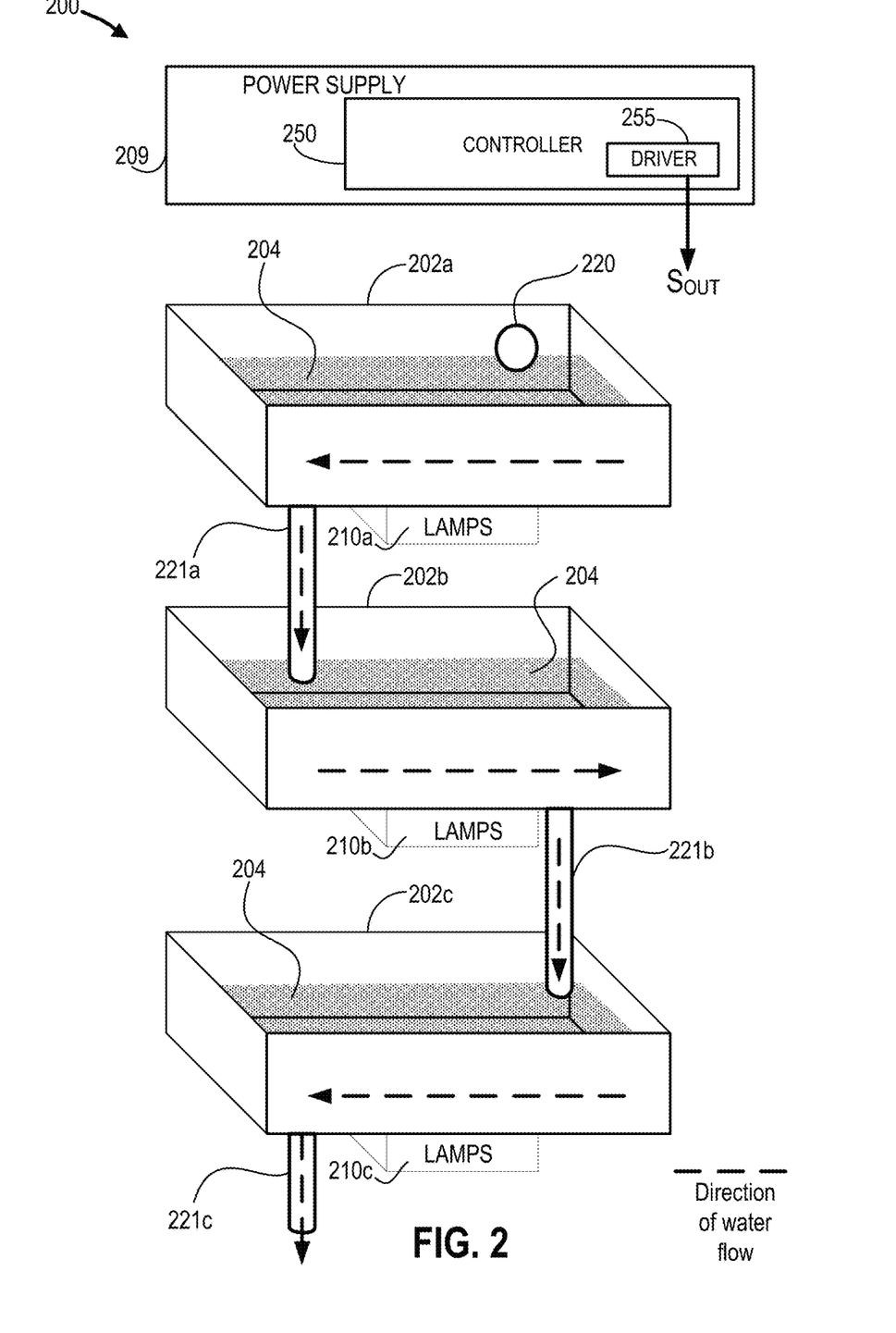
FIG. 2 illustrates a hydroponics system according to the teachings herein.

FIG. 2 illustrates a hydroponics system 200 according to the teachings herein. The hydroponics system 200 may include a power supply 209, hydroponics pans 202a-c, light sources 210a-c, and connecting component 221a-c, e.g., tubes. As illustrated, the hydroponics pans 202a-c may be assembled to form an array with hydroponics pan 202a arranged as the top pan and the other hydroponics pans positioned under hydroponics pan 202a. The hydroponics pans 202a-c may configured to receive and circulate solution 204 (e.g., a grow solution) for growing plants and/or microgreens; and the solution 204 may comprise water. For example, FIG. 2 illustrates the pans 202a-c as rectangular structures having four sides, a bottom, and an open top. Other shapes and dimensions can be used with the concepts presented herein. For example, the pans may be rounded or have a non-rectangular shape. For example, the pans may have a triangular, octagonal, hexagonal, etc. shaped bottom. The pans may have an asymmetric shape, e.g., to fit an opening in a particular room. The pans may comprise a container having a bottom and walls configured to hold a fluid and an opening to enable plants within the container to receive light from a lamp 210a-c. Additionally, the pans may be configured to form thermal contact with at least one. FIG. 2 illustrates light sources 210a-c may be in thermal contact with hydroponics pans 202a-c, respectively.

As shown in FIG. 2, the light source 210a can be positioned underneath the hydroponics pan 202a so that light and/or PAR light from the light source 210a can illuminate onto hydroponics pan 202b. By similar arrangement, PAR light from the light source 210b can illuminate onto the hydroponics pan 202c.

The power supply 209 may include a controller 250, and the controller may include a driver 255. The power supply may receive alternating current (ac) power and/or direct current (dc) power which may be converted to voltage levels (e.g., lower voltages) for driving electrical components of the hydroponics system 200. For instance, the power supply 209 can receive standard one-hundred and twenty volt ac power and convert it to a lower dc voltage for supplying power to the controller 250. The controller 250 may, in turn, receive signals (e.g., hydroponics system variables) indicative of the hydroponics system environment (e.g., a temperature of the solution 204). At least one sensor 115 may be coupled to a hydroponics pan and may provide a reading to the controller 250. The sensor may measure any of various parameters, e.g., any combination of light, temperature, humidity, pH, Electrical Conductivity (EC), light intensity, light intensity per a specific frequency, video, infrared video, and non-infrared video, etc. The controller may automatically adjust parameters of the hydroponics system, e.g., controlling light intensity, air flow, fluid circulation, etc. in response to receiving a measurement outside of a preferred range. The preferred range may be specific to the particular cultivar being grown in the hydroponics pans. In response to receiving signals, the controller may provide a signal vector $S_{OUT}$ comprising one or more signals for regulating system parameters. For instance, the signal vector $S_{OUT}$, may be provided to the light sources 210a-c to control light intensity. In controlling light intensity, the controller 250 may use the driver 255 (e.g., an LED driver) to provide the signal vector $S_{OUT}$ as a drive current (e.g., an LED current) thereby adjusting light intensity (i.e., light intensity from light sources 210a-c). The controller may also enable a user to take manual measurements of light, temperature, pH, etc. and to manually adjust a light intensity of at least one light source. As one of ordinary skill in the art may appreciate, the power supply 209 may comprise greater or fewer components to provide power to and to regulate the hydroponics system 200.

The controller may individually measure parameters for different wavelengths of light and may individually control different light sources that emit different wavelengths of light. For example, at least one quantum light meter may measures light intensity at a plant canopy level for a specific wavelength. The intensity may be measured for a wavelength outside 400-700 nm in PAR, e.g., such as 285 nm UV-B that may boost cultivar yield 20%. The measurement may also capture light intensity for wavelengths above PAR, e.g. 760 nm that may also increase yield. The controller may then adjust individual light sources to form a desired combination of wavelengths, each at a desired level. The controller may comprise multiple circuits, each circuit configured to activate and/or adjust a particular wavelength of light.

Figure 8:
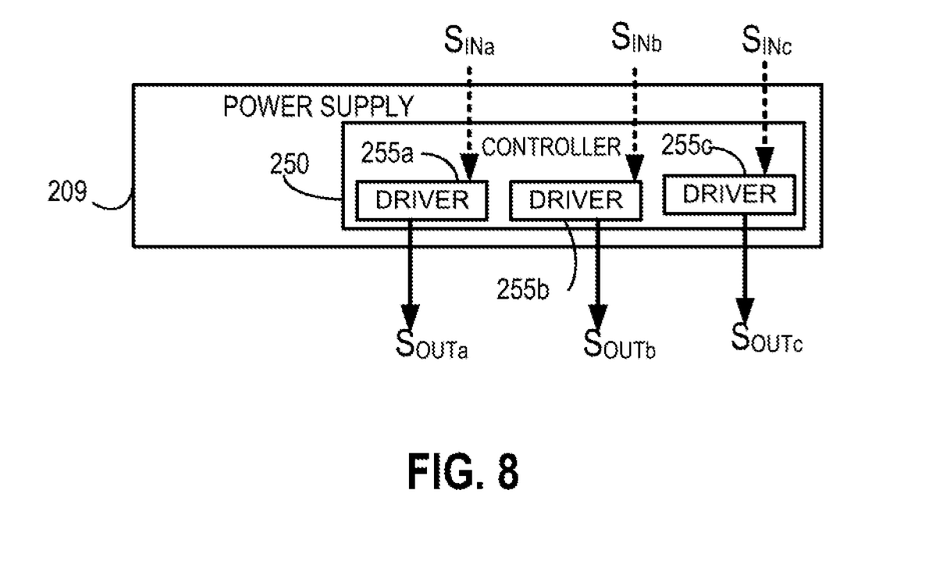
FIG. 8 illustrates example aspects of a controller for hydroponics systems according to the teachings herein.

Thus, the controller may variably control the intensity of individual light sources. This enables control over the spectrum with respect to time and frequency/wavelength. Thus, the controller may be able to detect the intensity for each of the wavelengths used. A signal may then undergo digital signal processing using a digital signal processing algorithm at the controller to determine a desired signal, e.g., a desired combination of wavelengths of light. The determination of the desired combination may also involve a determination of a desired intensity of each of multiple individual wavelengths in the desired combination. FIG. 8 illustrates an example similar to FIG. 2, in which the control comprises multiple drivers 255a, 255b, 255c, that each provide a signal to light sources having a different wavelength of light. The controller may output individual control signals $S_{OUT\ a}$, $S_{OUTb}$, $S_{OUTc}$, etc. for light sources of different colors of light. Similarly, the controller may receive individual measurement/control signals $S_{INa}$, $S_{INb}$, $S_{INc}$, etc. regarding the different light sources of different colors of light. While this figure illustrates 3 drivers, there may be more or less. For example, a control may comprise two drivers or may comprise 6 or more drivers. A look up table may be employed in the determination, e.g., for different cultivars. The controller may then give closed loop feedback to the constant current power supply for each of the individual wavelength of light.

Thus, a controller may control for white light with a single 100W light source that is a monolithic array of blue 460 nm LEDs coated with phosphorus excited by the blue LEDs to produce white light and heat. As another example, the white light source may be replaced with light sources of individual colors, each having their own simple circuit design coupled to the current power supply, e.g., with a dimmer circuit. The dimmer circuit may enable control of the individual intensity of each color of light. Using Fourier analysis, any given amplitude of any given frequency may be generated at any given time, e.g., in a manner similar to a digital to analog converter in the THz frequency range. Digital signal processing algorithms may be used by the controller to monitor and automatically the lights. Thus, the controller may actively adjust the spectrum; detect a spectrum incident on the plant canopy from different wavelengths; detect the fluorescence in the reflection of the plant canopy, e.g., when excited by 285 nm UV-B LED, that indicates peak photosynthesis; and/or significantly reduce the amount of energy required for peak plant yield. Energy used to drive indoor urban agriculture lighting can be the most expensive operating cost for the farmer. By using quantum generated LED colors to produce the exact amount of light that a plant needs, a user may save the amount of required to grow cultivars and also avoids generating heat from exciting phosphorus with 460 nm blue LEDs in order to generate white light.

The controller may also control the pump operation and fluid flow within the system. A pump may continuously pump fluid from a pump pan to an upper hydroponics pan. In other examples, the pump may operate in a periodic manner. The controller may comprise a timer that controls operation of the pump, e.g., including a length of time during which the pump stops pumping fluid and a length of time during which the pump circulates the fluid.

The controller may enable a user to remotely control the hydroponics system. For example, a measurement/signal from any of the example sensors may be provided to a user at a remote location. The remote user may receive temperature, pH, air quality, etc. measurements and/or may receive video or images of the hydroponics system. For example, the remote user may receive infrared video and/or non-infrared video that enables the user to determine adjustments to make to the light source(s), pump, and or air circulation system. The controller may also receive instructions from the remote user and to adjust the light source, pump, and/or air circulation system accordingly. This enables a farmer to tend to the crop remotely, even from a mobile device. This may enable the farmer to avoid the need for manual labor for watering, HVAC control, nutrients, raising and lowering lights, and/or security.

Figure 3A:
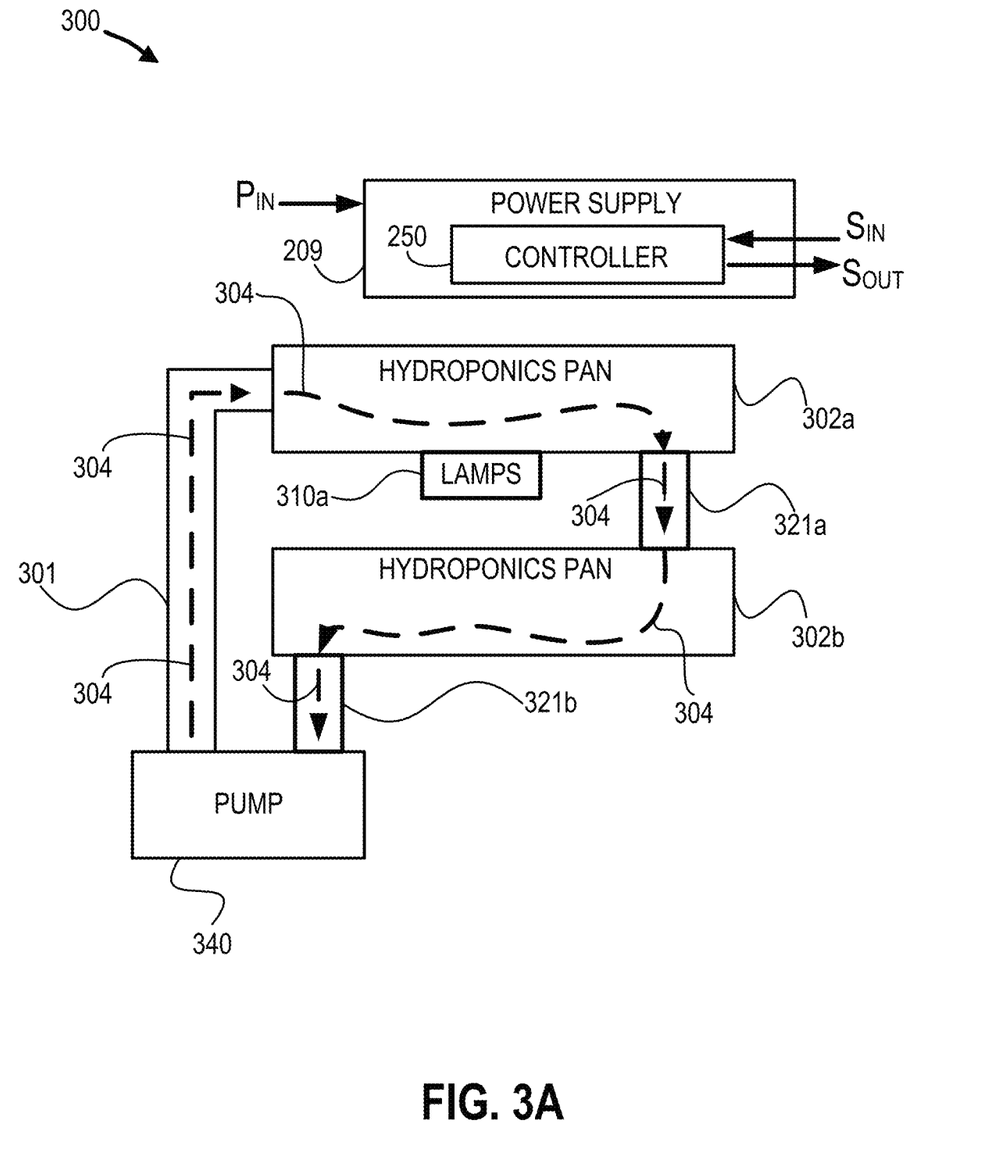
FIG. 3A illustrates a system diagram of a hydroponics system according to aspects of the present application.
Figure 3B:
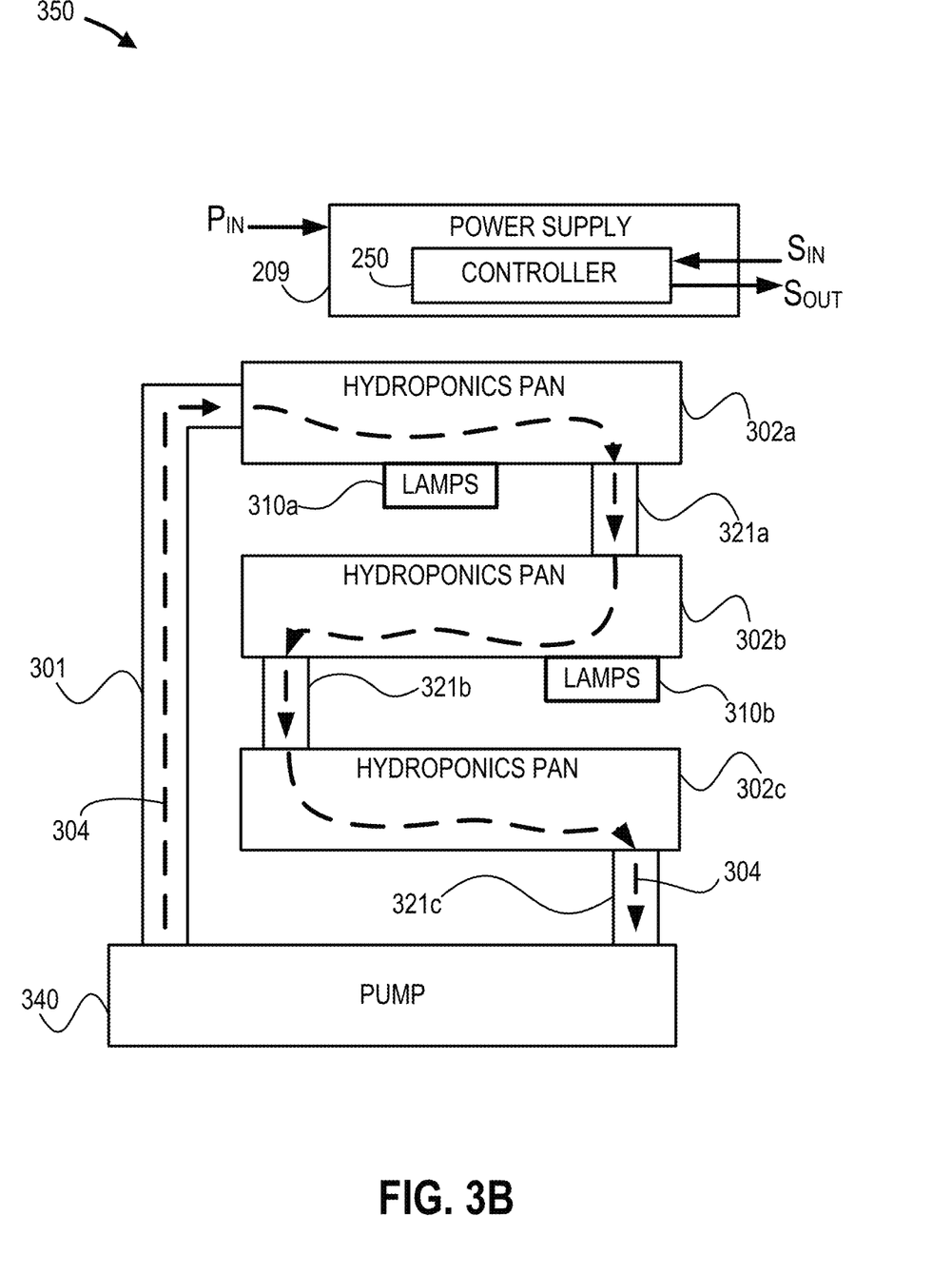
FIG. 3B illustrates a system diagram of a hydroponics system according to other aspects of the present application.

According to the teachings herein, the hydroponics pans 202a-c and tubes 221a-c may be arranged for series fluid flow within the hydroponics system 200, e.g., for fluid to flow across a pan before flowing into the next pan and so forth in a pattern. FIG. 2 illustrates the direction of water flow using arrows with a dashed line. Series fluid flow may advantageously enhance the transfer of heat from heat producing elements (e.g., the light sources 210a-c and/or power supplies 209) to the grow solution 204. Grow solution 204 or other fluid may be pumped to hydroponics pan 202a via an intake port 220, e.g., as illustrated in FIGS. 3A, 3B. The solution 204 may then circulate within the hydroponics pan 202a to transfer heat from the light source 210a to the grow solution 204. The grow solution 204 may then drain (i.e., flow) out of hydroponics pan 202a via the tube 221a into hydroponics pan 202b.

The solution 204 may further circulate within the hydroponics pan 202b to transfer heat from the light source 210b to the grow solution 204. Additionally, plants (e.g., microgreens) within the hydroponics pan 202b may receive the grow solution 204 and may also receive light from the light source 210a. The grow solution 204 may then drain (i.e., flow) out of hydroponics pan 202b via the tube 221b into hydroponics pan 202c.

The series flow may continue to hydroponics pan 202c in a similar manner whereby the hydroponics pan 202c receives the grow solution 204 for circulation and for transferring heat from light source 210c. According to the teachings herein, the tubes 221a-c may be arranged and separated to promote fluid circulation within the hydroponics pans 202a-c. For instance, tube 221c may be placed at an opposite end of hydroponics pan 221c from tube 221b. In this way fluid (e.g., grow solution 204) flows in series entering the hydroponics pan 202c near one side via tube 221b and draining near an opposite side via tube 221c. This may advantageously reduce stagnation of grow solution 204 and enhance heat conduction and hydroponics system performance.

FIG. 3A illustrates a system diagram of a hydroponics system 300 according to an example. The hydroponics system 300 has the power supply 209, hydroponics pans 302a-b, light source 310a (e.g., lamps and/or LEDs), pump 340, a tube 301 (i.e., an outflow tube), and tubes 321a-b. The system diagram shows a series flow (i.e., series fluid flow) arrangement of the hydroponics pans 302a-b with tubes 304a-b for circulating and providing solution 304.

As illustrated with a dash flow pattern, the solution 304 may be pumped from pump 340 through tube 301 (i.e., an outflow tube) to hydroponics pan 302a. Tube 321a may be placed so that it is separated from tube 301 (e.g., at an opposite end of hydroponics pan 302a). In this way the solution 304 may circulate in the hydroponics pan 302a to conduct heat from lamps 310a prior to draining via tube 321a to hydroponics pan 302b. The hydroponics pans may be positioned at an angle or may be positioned in a flat manner. The hydroponics pans may be configured to provide a thin sheet of hydroponic solution directly to media such as cocoa weave mat, e.g., using a titled position. In other examples, Styrofoam floating trays may be used, which may require flat plans with a 1.5" solution level. In another example, a variable height of solution from 0.5" to 1.5" in flat pan may be provided with an ebb flow pump that is periodically pulsed. As one example, the pump may be pulsed to operate for 30 minutes every 12 hours before turning off. These aspects may help to raise a cocoa weave media to a desired level. Tube 321b may be placed so that it is separated from tube 321a, and in this way the solution 304 may circulate in the hydroponics pan 302b to plants (e.g., microgreens) prior to draining via tube 321b to the pump. The pump 340 completes the series path of solution 304 to return the solution 304 to tube 301.

Using a series flow arrangement may advantageously enhance heat transfer by integrating the hydroponics pans 302a-302b as part of the flow path. Additionally, unlike other flow arrangements (e.g., parallel flow arrangements), series flow may avail a hydroponics system with fewer components (e.g., tubes) to occupy less space.

As shown in FIG. 3A the power supply may receive power input $S_{IN}$. As described above, power input $P_{IN}$ may be alternating current (ac) power and/or direct current (dc) power which may, in turn, be converted for driving electrical components of the hydroponics system 300. Also, the controller 250 may receive signals $S_{IN}$ (e.g., hydroponics system variables) indicative of the hydroponics system environment (e.g., a temperature of the solution 304). In response to receiving signals, the controller may provide a signal vector $S_{OUT}$ comprising one or more signals for regulating system parameters. For instance, the signal vector $S_{OUT}$ may be provided to the light source 310a to control light intensity.

FIG. 3B illustrates a system diagram of a hydroponics system 350 according to another example. Hydroponics system 350 is similar to hydroponics system 300 except it includes hydroponics pan 302c and tube 321c to increase the number of hydroponics pans used in a series flow arrangement. In the series flow arrangement shown in FIG. 3B, solution 304 may circulate in hydroponics pan 302b to plants (e.g., microgreens) while absorbing heat from the light source 310b. Solution 304 may drain via tube 321b to hydroponics pan 302c where the solution 304 circulates to additional plants prior to draining via tube 321c to the pump 340. The pump 340 again completes the series path of solution 304 pumping it through tube 301.

Figure 4A:
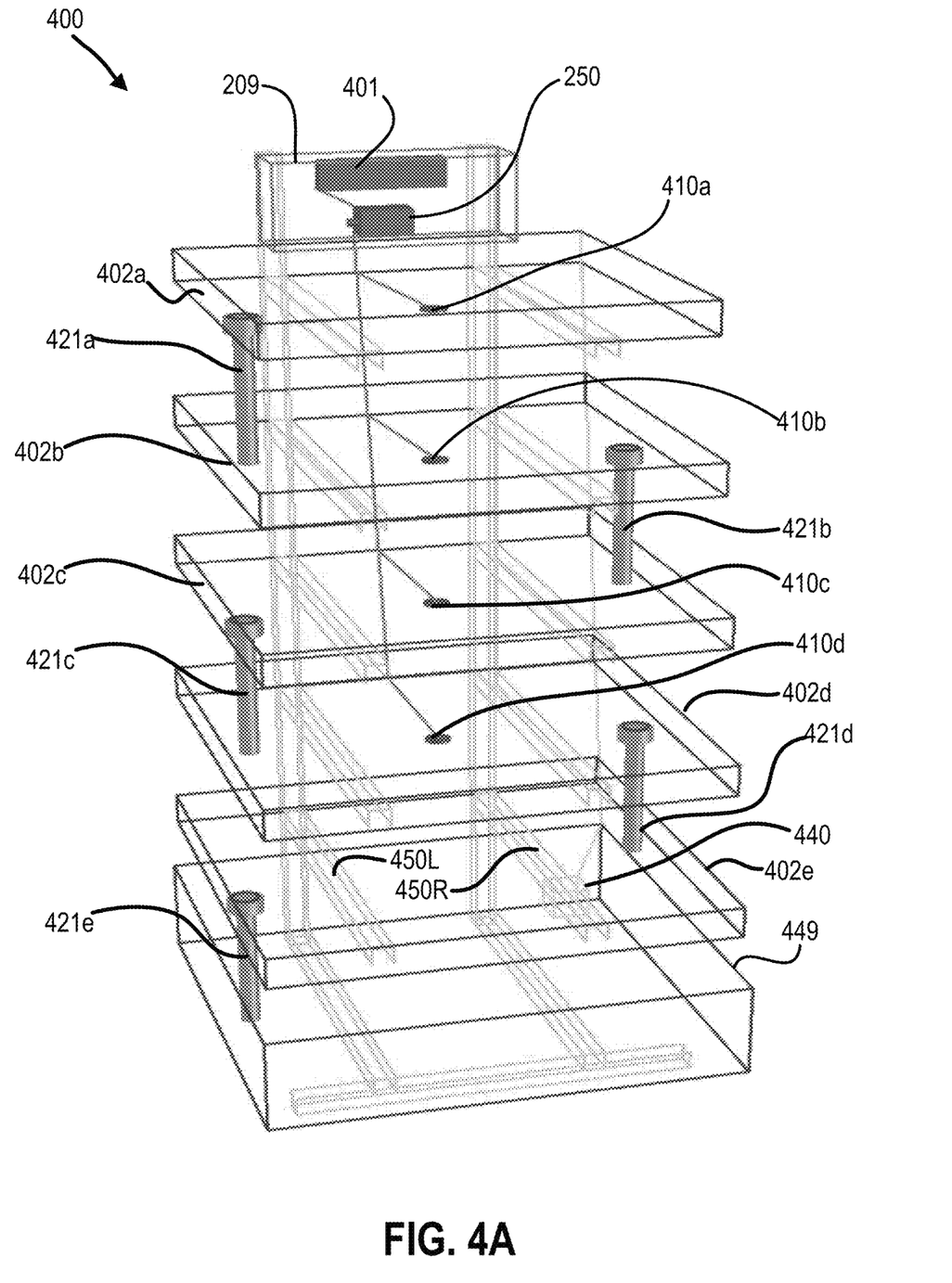
FIG. 4A illustrates a side perspective view of a hydroponics system according to aspects of the present application.

FIG. 4A illustrates a side perspective view of a hydroponics system 400 according to an example. Hydroponics system 400 includes the power supply 209, hydroponics pans 402a-e, light sources 410a-d (e.g., LEDs), a pump pan 449, a pump 440, and tubes 421a-e arranged for series flow of a solution (e.g., a grow solution), as described in connection with FIGS. 2-3B. The power supply 209 includes an ac converter 401 which may be electrically coupled with converter 250. As illustrated the converter 250 may be electrically coupled with the light sources 410a-d; and the light sources 410a-d may be in thermal contact with hydroponics pans 402a-d, respectively. In some aspects, electrical coupling with the light sources 410a-d may also avail two way transmission of signals $S_{IN}$ and signal vector $S_{OUT}$ to and from controller 250. Additionally, the controller 250 may be implemented using off the shelf components including a Raspberry Pi™ of Raspberry Pi Foundation.

Also, as illustrated, the hydroponics system 400 may be attached with a frame. The frame may comprise a main frame body multiple sets of supports that extend outward from the main frame body and are configured to receive and hold a pan. For example, the multiple sets of supports may each extend from the main frame in a parallel manner with a spacing that enables, e.g., a 32 inch spacing between adjacent frames. This may enable the frames to be mounted to wall studs having a 16 inch spacing. For instance, hydroponics pan 402e may be supported by frame components 450L, 450R; and the pump 440 may connect with a hydroponics pan 449 (i.e., a bottom pan that receives and collects the fluid that has flowed through each of the pans 402a-e, e.g., for recirculation). The frame components may have adjustable heights, e.g., along a central frame. FIG. 4A illustrates the central frame as a set of channels to which adjustable shelf brackets may be removably coupled. The central frame may be fastenable to a wall. Series flow can be similar to that described in the preceding description of FIGS. 2-3B, except the pump 440 may receive grow solution (e.g., solution 204) via hydroponics pan 449.

Figure 4B:
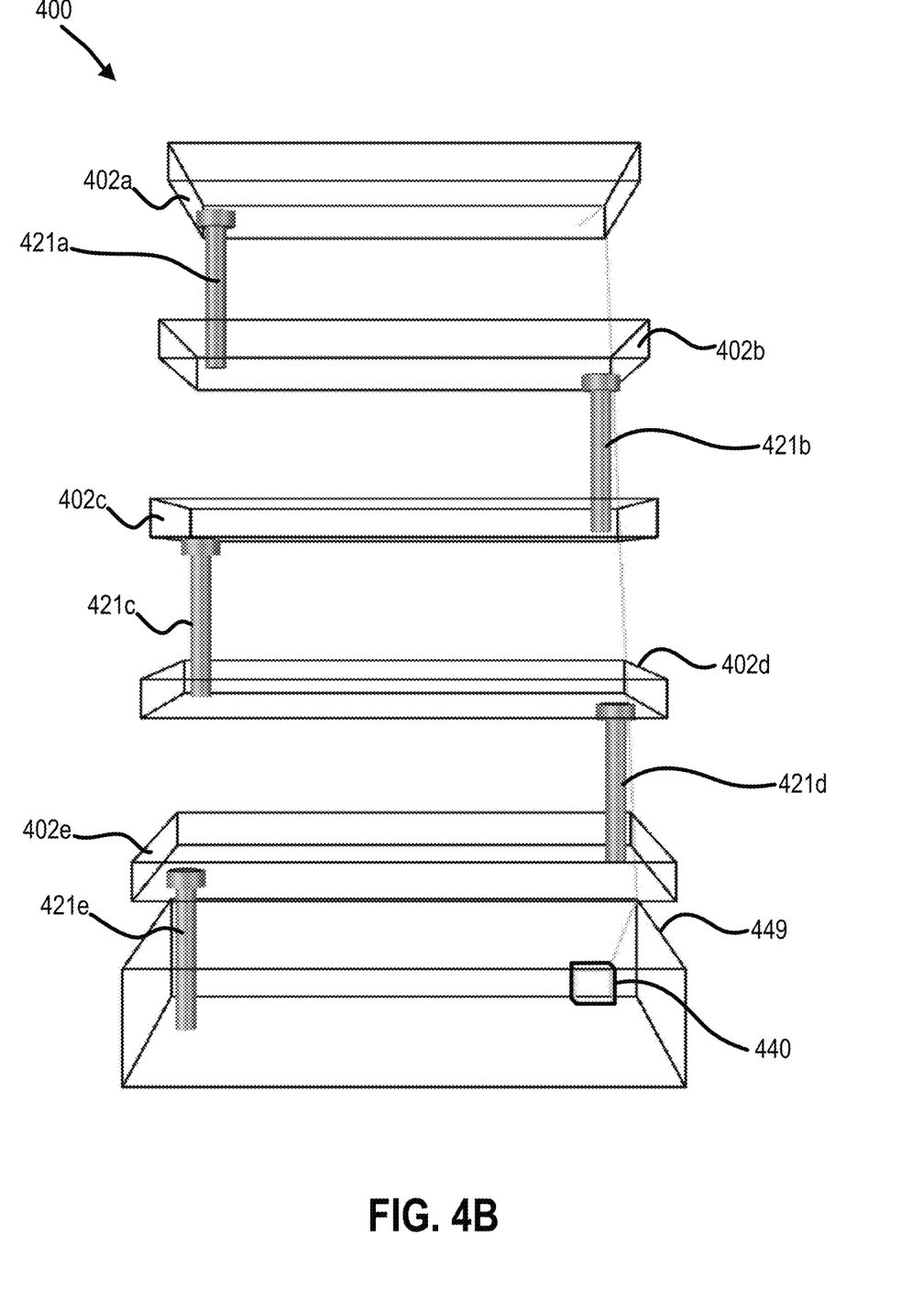
FIG. 4B illustrates a front perspective view of the hydroponics system according to the example of FIG. 4A.

FIG. 4B illustrates a front perspective view of the hydroponics system 400 according to the example of FIG. 4A. The front perspective view illustrates the series flow arrangement of hydroponics pans 402a-e with tubes 421a-e and pump 440. As illustrated the pump 440 may pump grow solution (e.g., solution 204) to hydroponics pan 402a (i.e., a top pan) where it circulates, and therefore absorbs heat from light source 410a as it moves along the body of the pan, and drains via tube 421a to hydroponics pan 402b. Grow solution may continue in a series path through each subsequent hydroponics pan (i.e., hydroponics pans 402b-e) and tube (i.e., tubes 421b-e) until it reaches hydroponics pan 449 (i.e., a bottom pan). Pump 440 may be coupled with hydroponics pan 449 to receive grow solution (e.g., solution 204), thereby completing the series flow arrangement.

Figure 6:
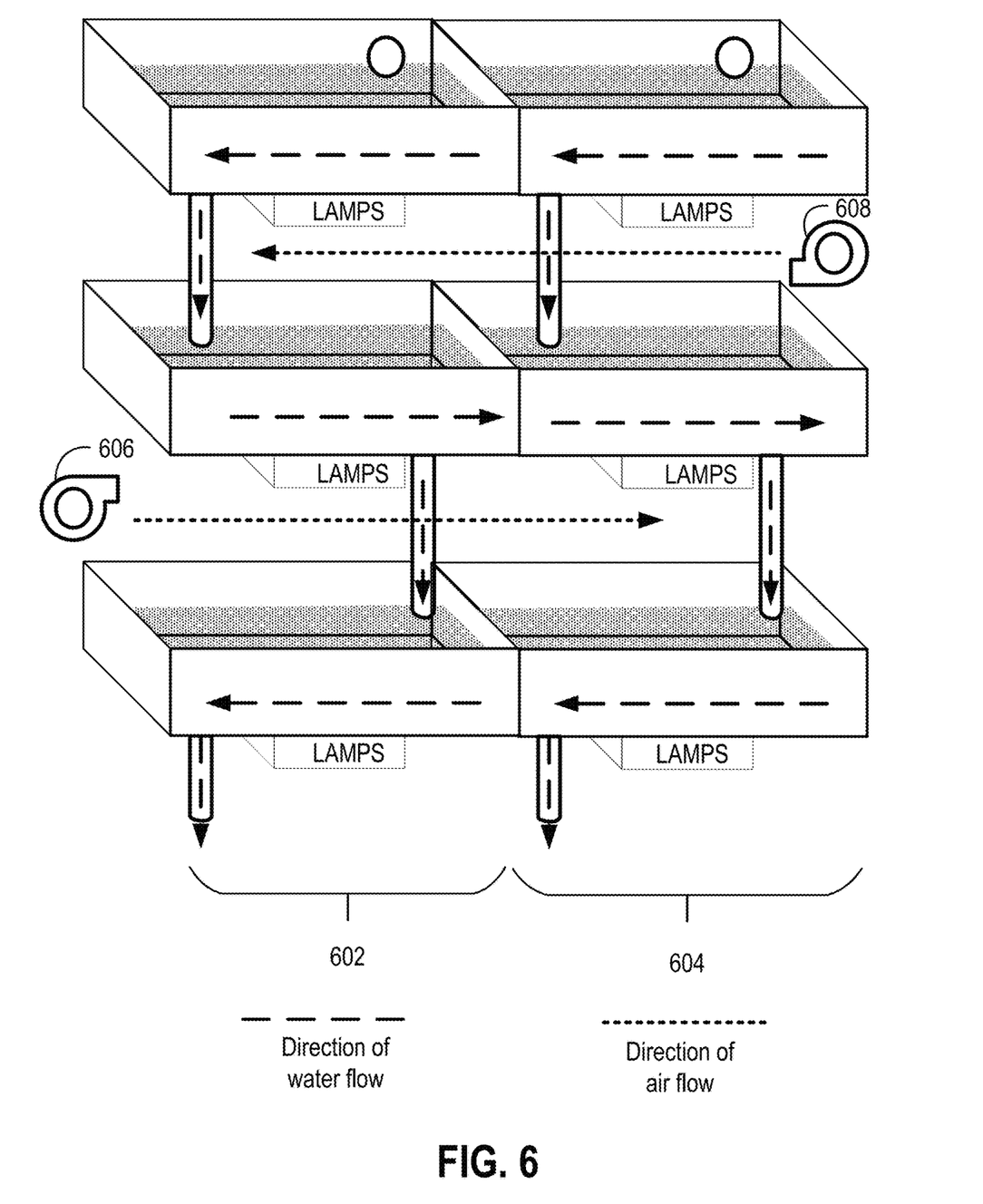
FIG. 6 illustrates an example of adjacent sets of hydroponic pans according to the teachings herein.
Figure 7:
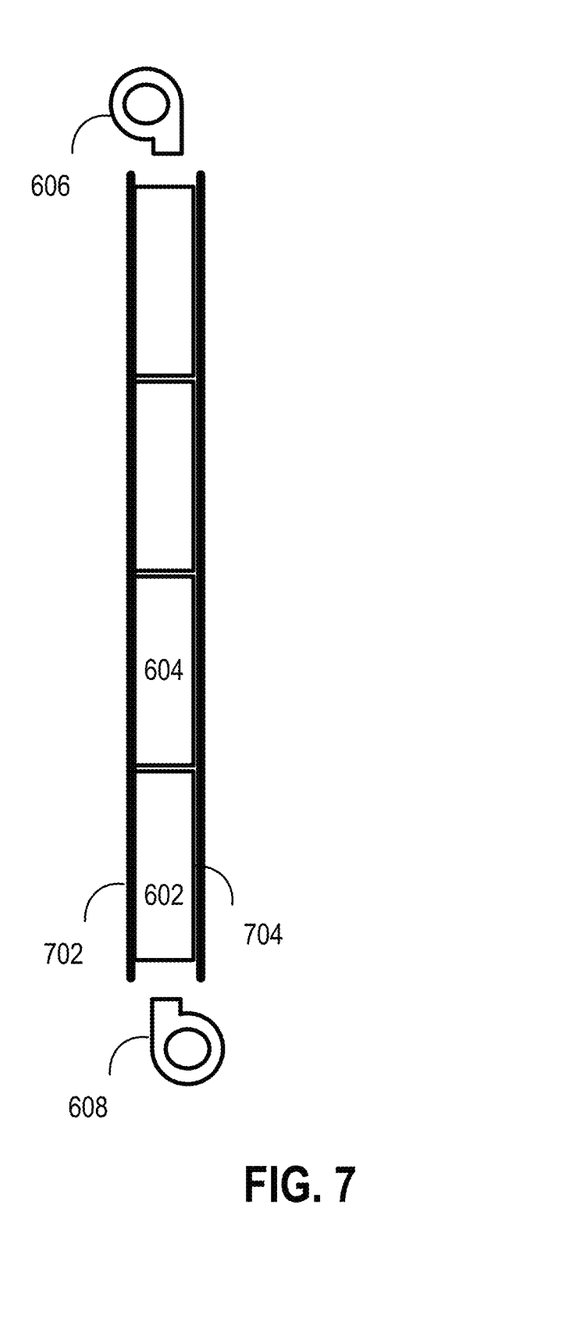
FIG. 7 illustrates an example of a row of adjacent sets of hydroponic pans according to the teachings herein.

As well, the hydroponics pans are configured such that multiple sets of stacked hydroponics pans can be positioned together to form a hydroponics system of any desired length, as illustrated in FIG. 6. While FIG. 6 only illustrates a first set of hydroponics pans 602 and a second set of hydroponics pans 604, any number of sets of hydroponics pans may be placed adjacent to each other. As well, while only three stacked hydroponics pans are illustrated in each set 602, 604, any number of hydroponics pans can be stacked in each set, e.g., according to a size constraint of a room or building. The hydroponics pans may be positioned such that the adjacent hydroponics pans have a small gap between each other, e.g., less than 3 inches or even less than 1 inch. In other examples, the hydroponics pans may contact each other. The placement of multiple sets of hydroponics pans together may provide a number of benefits. First, light from a light source in one hydroponics pan of a first set of hydroponics pans 602 may shine into a portion of an adjacent hydroponics pan of a second set of hydroponics pans 604. This allows the light to be used by cultivars growing in the adjacent hydroponics pan rather than being wasted. As well, each row of adjacent hydroponics pans in a combined system having multiple sets, e.g., columns, of hydroponics pans may form an air flow path. FIG. 6 illustrates a first fan 606 blowing air in a first direction over a row of adjacent hydroponics pans and a second fan 608 blowing air in the opposite direction over the next row of adjacent hydroponics pans. This pattern of air flow may be repeated for any number of rows of adjacent hydroponics pans. Thus, the air flow may follow a serpentine pattern similar to the flow of fluid within the pans. The air flow and the fluid flow may be in the same direction or in opposite directions. The rectangular shape of the hydroponics pans also may it possible to place a barrier, a wall, a layer of plastic, etc. against sides of the hydroponics pans. For example, a first side of the sets of adjacent hydroponics pans may be positioned near and/or fastened to a wall. A sheet of plastic may be positioned against the opposite side of the sets of adjacent hydroponics pans. Alternately, the sets of adjacent hydroponics pans may be positioned on a free standing shelf/frame and sheets of plastic may be positioned on either side of the adjacent sets of hydroponics pans. Thus, each row of adjacent hydroponics pans may form a channel for air flow. FIG. 7 illustrates a top view of multiple sets of adjacent hydroponics pans, e.g., 602, 604, ... from FIG. 6, have a first wall 702 and a second wall 704 place on opposite sides. The walls may be permanent walls or may be temporary layers, such as a plastic sheet. A fan 606, 608 may be positioned for each row of adjacent hydroponics pans, as illustrated in the side view of FIG. 6. Thus, the structure of the sets of hydroponics pans enables clean areas, or clean rooms to be established around cultivars to avoid contamination, the spread of disease, etc.

Figure 5:
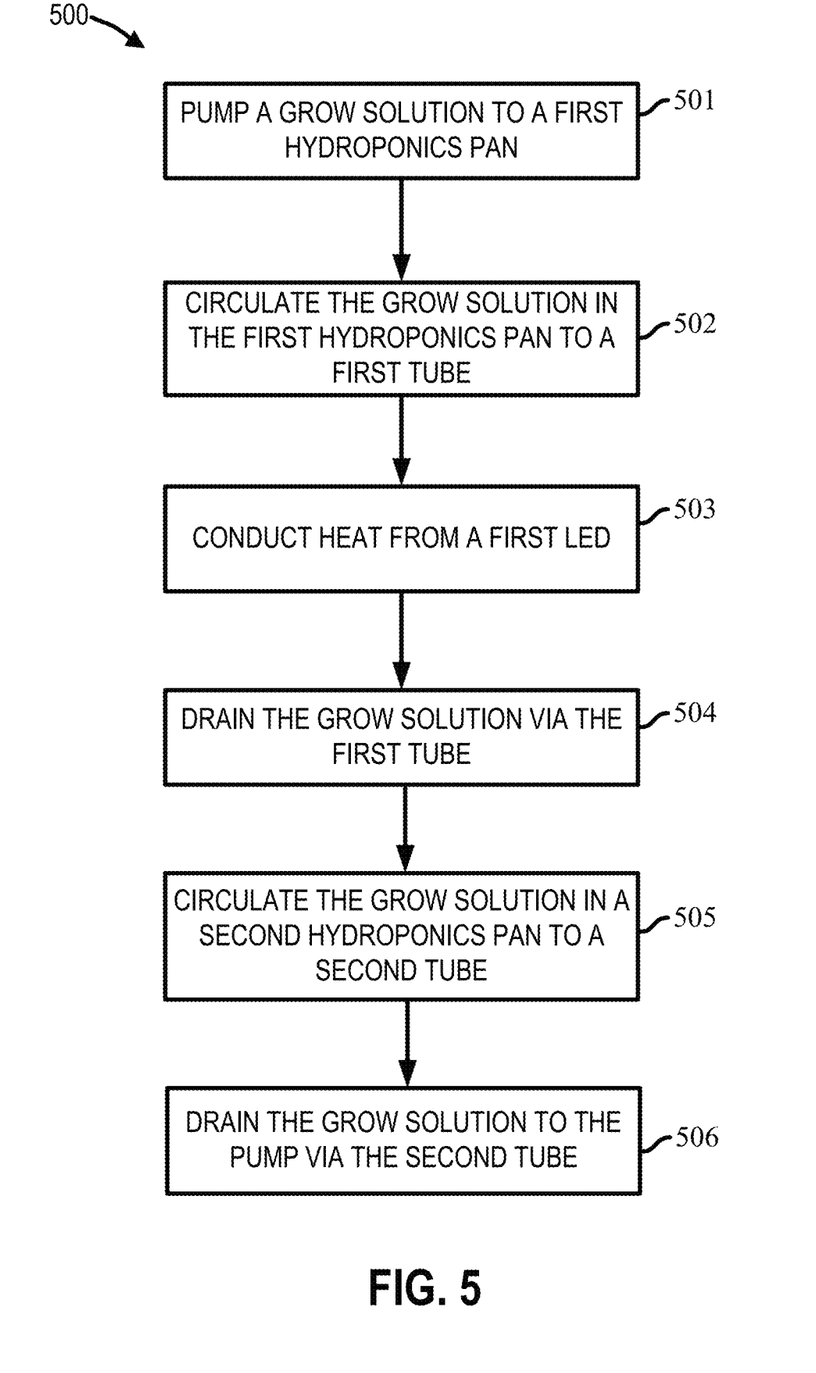
FIG. 5 illustrates a conceptual flow diagram of operating a hydroponics system according to the teachings herein.

FIG. 5 illustrates a conceptual flow diagram 500 of operating a hydroponics system according to the teachings herein. Operation for series flow may begin with step 501 to pump a grow solution (e.g., solution 304) to a first hydroponics pan (e.g., hydroponics pan 302a and hydroponics pan 402a). Step 502 may refer to circulating the grow solution in the first hydroponics pan and then to a first tube (e.g., tube 321a and tube 421a). Step 503 may refer to conducting (i.e., transferring) heat from a first LED (e.g., light source 310a and light source 410a) to the grow solution. Step 504 may refer to draining the grow solution via the first tube. Step 505 may then refer to circulating the grow solution in a second hydroponics pan (e.g., hydroponics pan 302c and hydroponics pan 402e) and then to a second tube (e.g., tube 321c and tube 421e). Step 506 may then refer to the series flow procedure of draining the grow solution to the pump (e.g., pump 340, 440) via the second tube.

Additionally, the circulation of the solution may advantageously allow the solution in the first and second hydrodynamic pans to share dissipated heat. According to the teachings herein, by sharing dissipated heat temperature can be reduced and/or controlled among hydrodynamics pans.

Although the teachings herein have been described in terms of certain examples, other examples that are apparent to those of ordinary skill in the art, including examples that do not provide all of the features and advantages set forth herein, are also within the scope of this invention. Moreover, the various examples described above and within the appendix can be combined to provide further examples. In addition, certain features shown in the context of one example can be incorporated into other examples as well.

The previous description is provided to enable any person skilled in the art to practice the various aspects described herein. Various modifications to these example aspects presented throughout this disclosure will be readily apparent to those skilled in the art, and the concepts disclosed herein may be applied to other techniques for transferring heat from grow lamps and heat producing elements within a hydroponics system. Thus, the claims are not intended to be limited to the examples presented throughout the disclosure, but are to be accorded the full scope consistent with the language claims. All structural and functional equivalents to the elements of the example aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A water cooled lighting system, comprising:
    a plurality of hydroponics pans comprising:
        a first hydroponics pan comprising a heat conductive material and configured to receive a grow solution at a first portion of the first hydroponics pan and having a first drain at a second portion of the first hydroponics pan opposite the first portion and configured to drain the grow solution from the first hydroponics pan to cool an uppermost semiconductor light source fixed to an exterior surface on a bottom of the first hydroponics pan; and
        a second hydroponics pan comprising the heat conductive material and configured to receive the grow solution from the first drain of the first hydroponics pan and comprising a second drain configured to drain the grow solution from the second hydroponics pan to cool a second semiconductor light source fixed to the second hydroponics pan;
    and
    the uppermost semiconductor light source directly fixed without a chassis to the exterior surface on the bottom of the first hydroponics pan with a thermal adhesive to provide a thermal coupling configured to transfer heat from the uppermost semiconductor light source to the grow solution via the thermal adhesive and the heat conductive material of the first hydroponics pan, the uppermost semiconductor light source comprising a light emitting diode (LED) or a printed circuit board with one or more LEDs that is directly attached, without the chassis, to the exterior surface on the bottom of the first hydroponics pan with the thermal adhesive.

2. The water cooled lighting system of claim 1, wherein the thermal adhesive comprises one or more of a thermal grease, a thermal paste, a thermal epoxy, and wherein the uppermost semiconductor light source is attached to the exterior surface of the first hydroponics pan at a level with the grow solution such that the heat conductive material of the first hydroponics pan is configured to conduct the heat from the uppermost semiconductor light source to the grow solution that passes through the first hydroponics pan to the second hydroponics pan.

3. The water cooled lighting system of claim 1, further comprising:
    a pump system configured to recirculate the grow solution through the plurality of hydroponics pans to cool the uppermost semiconductor light source to an ambient temperature, the pump system comprising:
        a pump pan configured to receive the grow solution after the grow solution has traversed at least the first drain and the second drain;
        a pump configured to pump the grow solution from the pump pan to the first hydroponics pan; and
        a first tube configured to couple to the first drain and a second tube coupled to the second drain.

4. The water cooled lighting system of claim 1, wherein the first hydroponics pan and the second hydroponics pan are rectangular and configured to stack to form a first column of stacked hydroponics pans and to be connected in an array adjacent to an additional column of the stacked hydroponics pans.

5. The water cooled lighting system of claim 1, wherein the uppermost semiconductor light source is configured to provide light to the second hydroponics pan, the system further comprising:
    a power supply attached to the exterior surface of at least one of the plurality of hydroponics pans separately from an attachment of the uppermost semiconductor light source, wherein the power supply is configured to provide power to the uppermost semiconductor light source, and wherein the power supply comprises a controller configured to measure or control at least one parameter of the uppermost semiconductor light source.

6. The water cooled lighting system of claim 5, wherein the at least one parameter comprises light intensity.

7. The water cooled lighting system of claim 5, wherein the controller comprises an LED driver.

8. The water cooled lighting system of claim 5, wherein the at least one parameter comprises an LED photon efficiency.

9. The water cooled lighting system of claim 5, wherein the power supply is attached to the exterior surface of at least one of the first hydroponics pan or the second hydroponics pan and having thermal contact with the heat conductive material at a level with the grow solution.

10. The water cooled lighting system of claim 5, wherein the hydroponics system comprises multiple light sources, each of the multiple light sources being attached to the exterior surface of at least one of the plurality of hydroponics pans, and wherein the controller is configured to separately control a light intensity for a subset of one or more of the multiple light sources.

11. The water cooled lighting system of claim 10, further comprising at least one sensor, wherein the controller individually adjusts the one or more of the light intensity or a wavelength output based on measurements of the at least one sensor.

12. The water cooled lighting system of claim 10, wherein each of the multiple light sources comprises a quantum generated light emitting diode (LED), and the controller is configured to adjust individual quantum generated LED wavelengths to form a combination of wavelengths.

13. The water cooled lighting system of claim 12, wherein the combination of wavelengths includes an ultraviolet wavelength of 285 nm and below a lower limit of 400 nm for photosynthetic active radiation (PAR).

14. The water cooled lighting system of claim 12, wherein the combination of wavelengths includes a far red wavelength of 760 nm and above an upper limit of 700 nm for photosynthetic active radiation (PAR).

15. The water cooled lighting system of claim 5, wherein the water cooled lighting system comprises multiple light sources, each of the multiple light sources attached to the exterior surface of at least one of the plurality of hydroponics pans, and wherein the controller is configured to separately control a wavelength and light intensity for a subset of one or more of the multiple light sources.

16. The water cooled lighting system of claim 15, wherein the controller is configured to separately control the light intensity and wavelength with respect to time for the subset of one or more of the multiple light sources.

17. The water cooled lighting system of claim 5, wherein the water cooled lighting system comprises multiple light sources, each of the multiple light sources being attached to the exterior surface of at least one of the plurality of hydroponics pans, and wherein the controller is configured to individually adjust one or more of light intensity or wavelength output for each of the multiple light sources over time.

18. The water cooled lighting system of claim 5, wherein the controller is configured to:
individually measure parameters for different wavelengths of light; and
individually control one or more of an intensity or an output wavelength for each of multiple light sources.

19. The water cooled lighting system of claim 5, comprising multiple power supplies with different power supplies for different wavelengths of light.

20. The water cooled lighting system of claim 19, wherein the controller is configured to independently control each of the multiple power supplies for independent control over an intensity of the different wavelengths of light.

21. The water cooled lighting system of claim 19, further comprising: a potentiometer configured to vary an intensity of the different wavelengths of light.

22. The water cooled lighting system of claim 1, wherein the uppermost semiconductor light source does not include a separate cooling mechanism.

23. The water cooled lighting system of claim 1, wherein the uppermost semiconductor light source is directly fixed to the exterior surface on the bottom of the first hydroponics pan with a thermal grease and an aluminum tape.

24. The water cooled lighting system of claim 1, wherein each light source for a stack of hydroponic pans is coupled to a corresponding hydroponics pan configured to receive and drain the grow solution.

25. The water cooled lighting system of claim 1, wherein the first hydroponics pan does not have a light source disposed above the first hydroponics pan.

26. The water cooled lighting system of claim 1, wherein the first hydroponics pan forms a germination pan.

27. A method of operating a water cooled lighting system comprising:
pumping a grow solution to a first portion of an interior of a first hydroponics pan from a pump, the first hydroponics pan comprising an uppermost semiconductor light source fixed to an exterior surface of the first hydroponics pan with a thermal adhesive to provide a thermal coupling, the uppermost semiconductor light source comprising a light emitting diode (LED) or a printed circuit board with one or more LEDs that is directly attached, without an intervening chassis, to the exterior surface on a bottom of the first hydroponics pan with the thermal adhesive;
draining the grow solution from a second portion of the first hydroponics pan into a second hydroponics pan, the second portion being on an opposite end of the first hydroponics pan than the first portion;
draining the grow solution from the second hydroponics pan via a drain, wherein the drain is positioned opposite the second portion of the first hydroponics pan such that the grow solution flows in a serpentine pattern through the first hydroponics pan and the second hydroponics pan; and
circulating the grow solution via the pump to cool the uppermost semiconductor light source to an ambient temperature.

28. The method of claim 27, further comprising:
controlling a hydroponics system parameter, wherein the hydroponics system parameter comprises at least one of a photosynthetic photon flux density (PPFD) and an LED current.

29. A water cooled lighting system comprising:
a plurality of hydroponics pans arranged in an array and comprising a top pan and a bottom pan;
a pump connected to an outflow tube, the outflow tube configured to receive a fluid from the bottom pan and to provide the fluid to the top pan; and
a plurality of light sources fixed to an exterior surface on a bottom of the plurality of hydroponics pans with a thermal adhesive to provide a thermal coupling, including an uppermost semiconductor light source attached to the exterior surface of a first hydroponics pan of the plurality of hydroponics pans with the thermal coupling configured to transfer heat from the uppermost semiconductor light source to the fluid via a heat conductive material of the first hydroponics pan, the uppermost semiconductor light source comprising a light emitting diode (LED) or a printed circuit board with one or more LEDs that is directly attached, without an intervening chassis, to the exterior surface on the bottom of the first hydroponics pan with the thermal adhesive,
wherein the first hydroponics pan is configured to receive the fluid from the pump, to circulate the fluid across the first hydroponics pan, and to drain the fluid via a first drain into a second hydroponics pan of the plurality of hydroponics pans to cool the uppermost semiconductor light source to an ambient temperature.

30. The water cooled lighting system of claim 29, further comprising:
wherein the second hydroponics pan is configured to receive the fluid from the first drain of the first hydroponics pan, to circulate the fluid across the second hydroponics pan in an opposite direction than a direction in which the fluid circulates across the first hydroponics pan, and to drain the fluid via a second drain.

31. The water cooled lighting system of claim 29, further comprising:
a controller attached to the exterior surface of one of the plurality of hydroponics pans separately from an attachment of the plurality of light sources and configured to measure or control at least one parameter of the plurality of light sources.

32. The water cooled lighting system of claim 31, wherein the controller attached to the exterior surface of at least one of the first hydroponics pan or the second hydroponics pan and having thermal contact with the heat conductive material at a level with a grow solution.

33. The water cooled lighting system of claim 31, wherein the at least one parameter comprises one or more of a photosynthetic photon flux density (PPFD) and an LED current.

34. The water cooled lighting system of claim 31, wherein the plurality of hydroponics pans includes a first stack of rectangular hydroponics pans and a second stack of rectangular hydroponics pans positioned adjacent to the first stack to form an air flow passage that extends across adjacent hydroponics pans in the first stack and the second stack.

* * * * *